Nov. 29, 1960    A. J. HILGERT    2,962,718
CONTROL DEVICES

Filed July 2, 1956    3 Sheets-Sheet 1

INVENTOR.
Adolph J. Hilgert
BY
Seegert & Schwalbach
Attys

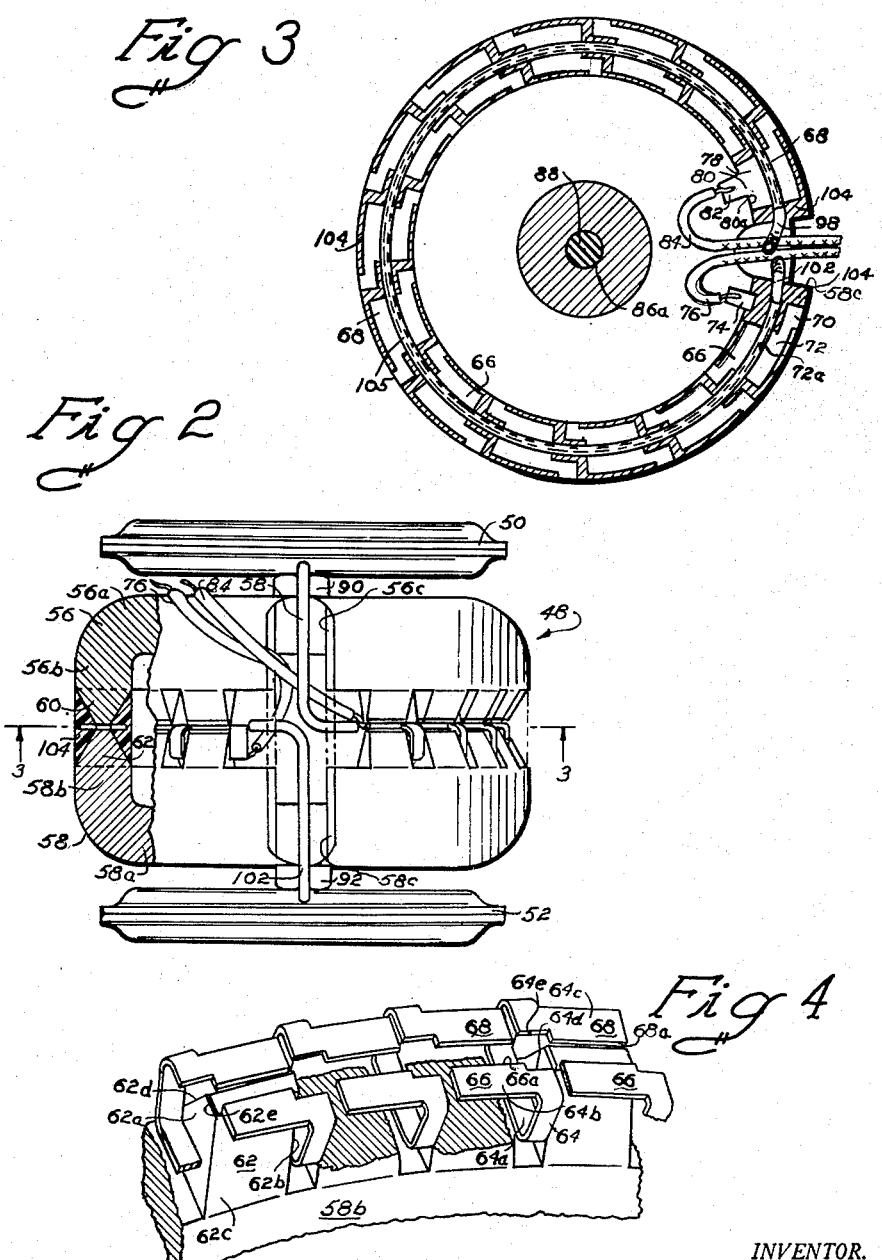

Nov. 29, 1960
A. J. HILGERT
CONTROL DEVICES
2,962,718
Filed July 2, 1956
3 Sheets-Sheet 3
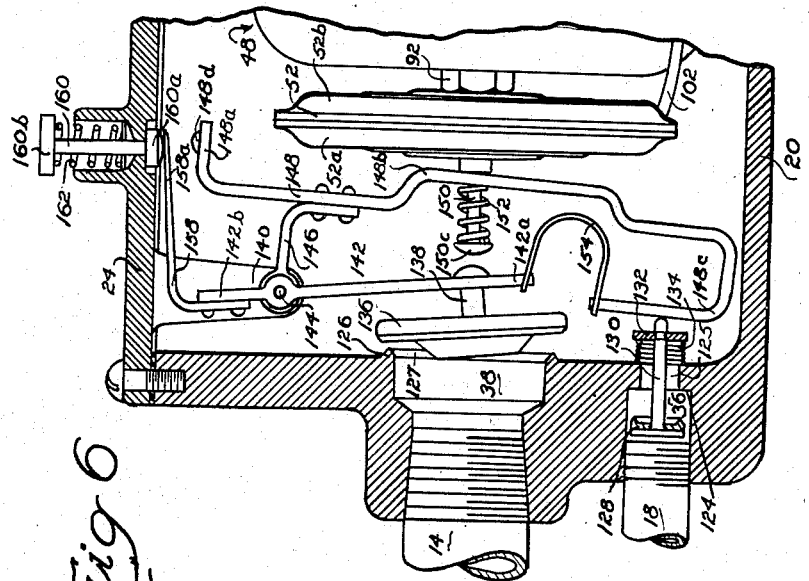
INVENTOR.
Adolph J. Hilgert
BY
Seegert & Schwalbach
Att'ys

United States Patent Office 2,962,718
Patented Nov. 29, 1960

2,962,718

CONTROL DEVICES

Adolph J. Hilgert, Milwaukee, Wis., assignor to Baso Inc., Milwaukee, Wis., a corporation of Wisconsin Filed July 2, 1956, Ser. No. 595,539

11 Claims. (Cl. 158—131)

This invention relates to control device and more particularly to devices for control of fluid fuel flow to a main fuel burner and an ignition burner therefor in a predetermined sequence. Further, the present invention teaches the use of a single operator for moving a pair of control members in a predetermined sequence and subject to a plurality of conditions.

An object of this invention, therefore, is to provide a flow control device having one electrically energizable operator cooperable with several flow control members such that energization of the operator at different energy levels effects positioning of the control members in different relative positions.

Another object of this invention is to provide a control device having a fluid conductor motor which develops an actuating force proportional to the degree of energization thereof, and at least two control members operatively associated with said motor in such a manner that energization of said motor at a first energy level creates a force on only one of said control members, and energization of said motor at a second higher energy level creates a force on both of said control members.

Another object is to provide a control device having two flow control members and a single operator therefor, there being a condition responsive device in circuit with said operator whereby predetermined variations in a given condition causes said operator to effect corresponding movement of only one of said flow control members and retention of the other control member in a predetermined one of its controlling positions, occurrence of an undesirable condition causing said operator to position said one of said control members in a predetermined one of its controlling positions and said other control member in a position other than said predetermined one irrespective of said condition responsive device.

Another object of this invention is to provide a control device comprising an electrically energizable fluid conductor motor and a control member, there being actuating means interposed between said motor and said control member whereby predetermined energization of said motor effects snap action movement of said control member from one to another of its controlling positions.

Another object of this invention is to provide a control device having an electroresponsive operator and two control members for actuation thereby, there being means for manually moving one of said control members from one to another of its controlling positions while preventing movement of the other control member from its initial position, said operator maintaining said one control member in the position to which it is moved by energization thereof at a first energy level, said operator effecting snap action movement of the other of said control members from one to another of its controlling positions while continuing to retain said one control member in the position to which it is moved by energization thereof at a second higher energy level, deenergization of said operator effecting return of both of said control members to their initial positions.

Another object is to provide a control device characterized as above set forth wherein the operator is a fluid conductor motor which comprises a plurality of serially arranged electrical gaps and a corresponding number of magnetic gaps formed by oppositely disposed salient magnetic poles.

Another object of this invention is to provide a control device characterized as above set forth wherein the operator is a fluid conductor motor having fluid connection with a fluid reservoir and a fluid pressure responsive expansible and contractible actuator, the latter being associated with the control members for operation thereof as set forth above.

Another object is to provide a control device having a fluid conductor motor operatively associated with a pair of control members as above set forth and a thermoelectric generator for energization of said motor, there being circuit controlling means including condition responsive switch in circuit with said generator and said motor to permit substantially all of the electrical energy available at said generator to flow to said motor whenever a given condition exists, and to limit the electrical energy flow to said motor whenever said given condition does not exist.

Another object of this invention is to provide fluid fuel burning apparatus comprising a main burner and a fuel flow control valve therefor, a pilot burner and a fuel flow control valve therefor, and an operator for said valves including a fluid conductor motor energizable by a thermoelectric generator which is responsive to a flame at the pilot burner; there being means in circuit with said generator and motor to limit current flow to said motor to that necessary to maintain said pilot valve in open position when moved thereto and a thermostatic switch also in circuit with said generator and motor and responsive to a given condition to afford energization of said motor at a level sufficient to move said main valve to open position, outage of the flame at the pilot burner returning both said main and pilot valves to closed position irrespective of said thermostatic switch.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

Figure 2 is an elevational view of the fluid conductor motor with certain parts broken away, there being a fluid reservoir and a pressure responsive actuator connected to said motor;

Figure 3 is a sectional view of the fluid conductor motor taken substantially along line 3—3 of Figure 2;

Figure 4 is a perspective view of one of the magnet pole pieces and associated electrical pole pieces, certain of the parts being broken away;

Figure 5 is a sectional fragmentary view of the control device showing the pilot and main valves and actuating mechanism therefor in resetting position; and Figure 6 is a sectional fragmentary view similar to Figure 5 but showing the pilot and main valves in open position.

Like reference characters indicate corresponding parts throughout the several views of the drawings.

Figure 1:
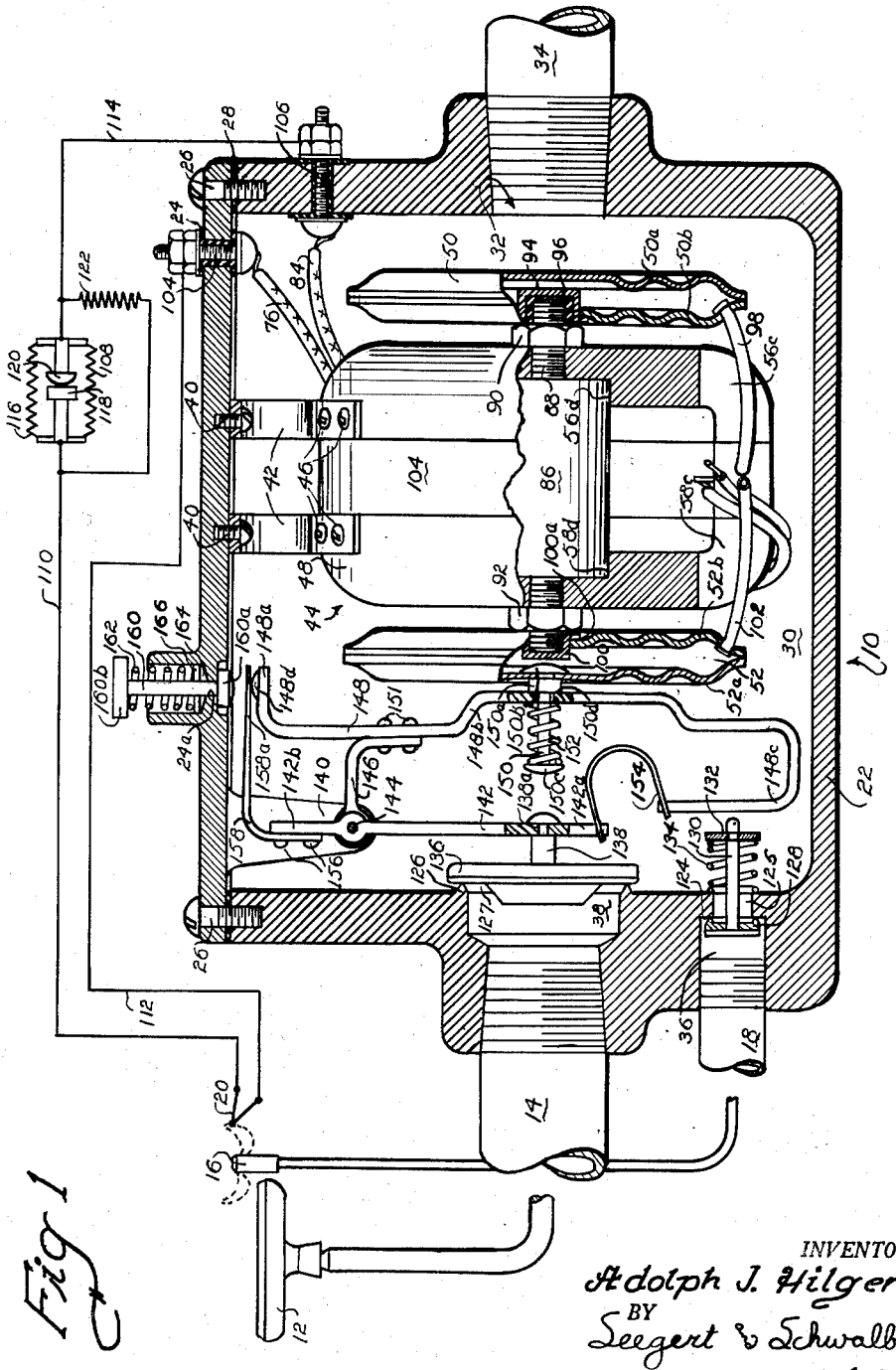
Figure 1 is a sectional view of a control device embodying the subject fluid conductor motor, said device being shown more or less schematically, connected with various other components of a control apparatus.

Referring to Figure 1 of the drawings, it shows a fluid flow control device 10 connected to a main burner 12 by a fluid conduit 14. Positioned adjacent main burner 12 is an ignition or pilot burner 16 which is connected to control device 10 by a fluid conduit 18. A thermoelectric generator or thermocouple 20 is positioned adjacent pilot burner 16 for generation of an electric current, as well understood in the art, whenever pilot burner 16 is ignited.

Body 22 is formed with a fuel inlet chamber 32, a pilot fuel outlet chamber 36 and a main fuel outlet chamber 38. Threadably secured to inlet chamber 32 is a fluid conduit 34 for transmission of fluid fuel from a source thereof (not shown). Conduit 18 is afforded threaded connection with pilot outlet chamber 36 and conduit 14 is threadably connected to main outlet chamber 38. Control device 10 comprises a control body 22 adapted with a cover 24 secured thereto by means of bolts 26. A gasket 28 is interposed between said body 22 and cover 24 to provide a gas tight seal therebetween.

Fixed relative to cover 24 by means of bolts 40, brackets 42 and screws 46, is a valve operator 44 comprising an electromagnetic fluid conductor motor comprising an electromagnetic fluid conductor pump 48, a fluid reservoir 50 and a fluid pressure responsive expansible and contractible actuator 52. The electromagnetic fluid conductor pump 48 comprises a pair of oppositely disposed cup-shaped magnetic members 56 and 58 each of which is formed of magnetically permeable material such as soft iron and has a main body portion 56a and 58a respectively, and an annular flange-like pole portion 56b and 58b respectively, as shown most clearly in Figures 2 and 3. Each of pole portions 56b and 58b is formed with a plurality of salient magnetic poles 60 and 62 respectively. As shown in Figure 2, each of said magnetic poles 60 is aligned with and disposed directly opposite one of said magnetic poles 62 to provide a magnetic gap therebetween. In this manner a plurality of magnetic gaps is provided between the oppositely disposed magnetic members 56 and 58, said magnetic gaps being aligned in accordance with the annular shape of the pole portions 56b and 58b.

Although Figure 4 shows the details of construction of the salient magnetic poles of only portion 58b, it is to be understood that pole portion 56b is formed substantially identically therewith. Each of the magnetic poles 62 of pole portion 58b is formed with a pair of substantially parallel flat opposite sides 62a and 62b, a pair of angularly disposed substantially flat opposite sides 62c and 62d and a pole face 62e.

Positioned within each of the spaces between adjacent magnetic poles 62, is an electrical conductor 64 formed of copper and having an intermediate portion 64a formed with four substantially right angle bends and a pair of oppositely offset end portions 64b and 64c, said end portion 64b providing an electrical pole 66 on one side of one of said magnetic gaps and said end portion 64c providing an electrical pole 68 on the other side of the magnetic gap adjacent thereto when conductor 64 is positioned as shown in Figure 4.

Each of the electrical poles 66 and 68 is formed with a pole face 66a and 68a respectively whereby, with the conductors 64 positioned as shown in Figure 4, the plurality of oppositely disposed pole faces 66a and 68a provide an electrical gap coincident with and at right angles with respect to each of the magnetic gaps afforded by oppositely disposed magnetic pole faces. Each of the end portions 64b and 64c of conductor 64 is formed with a notch or cutout 64d and 64e respectively to prevent shorting of electric current from flow across said electrical gaps as will hereinafter become apparent.

As shown in Figures 1, 2 and 3, each of magnetic members 56 and 58 is further formed with an opening 56c and 58c respectively. An electrical conductor 70 formed of copper and having two substantially right angle bends is positioned adjacent opening 58c of member 58. Conductor 70 is further formed with an offset end portion providing an electrical pole 72 having a pole face 72a. The end of conductor 70 opposite said offset portion provides a terminal portion 74 which, as shown in Figures 1 and 3, extends toward the interior of magnetic member 58. One end of a lead wire 76 is fixed to terminal portion 74 as by welding or soldering.

A substantially flat electrical conductor 78 formed of copper and having an enlarged end portion providing an electrical pole 80 is positioned adjacent said opening 58c but to the side thereof opposite conductor 70. Conductor 78 is formed with a terminal portion 82 to which is attached by means such as welding or soldering one end of a lead wire 84. As shown in Figure 3, electrical pole 72 is disposed opposite one of the electrical poles 66 to provide an electrical gap between pole faces 66a and 72a. Also, electrical pole 80 is disposed opposite one of the electrical poles 68 to cooperate therewith to provide an electrical gap between pole faces 68a and 80a.

In order to retain the salient magnetic poles 60 and 62 in fixed relative positions, and to afford means for magnetic flux flow across the plurality of magnetic gaps, a cylindrically shaped permanent magnet 86 is positioned within openings or depressions 56d and 58d formed respectively in main body portions 56a and 58a of magnetic members 56 and 58. Permanent magnet 86 is formed with a through opening 86a in which is slidably positioned a shaft 88 formed of electrical insulating material. A nut 90 is provided for the end of shaft 88 adjacent magnetic member 56 and a nut 92 is provided for the end thereof adjacent magnetic member 58. With nuts 90 and 92 drawn up tightly against their respective magnetic members, permanent magnet 86 and magnetic members 56 and 58 are held in fixed relation.

Fluid reservoir 50 is formed with flexible stainless steel side walls 50a and 50b fastened together along their marginal edges as by welding to provide an hermetically sealed enclosure for expansion and contraction in accordance with the difference between the internal and external pressures as will hereinafter appear. A fitting 94 is fixed relative to the end of shaft 88 adapted with nut 90, there being electrical insulating means 96 interposed therebetween. Fitting 94 is also attached to wall 50b of reservoir 50 by welding an annular flange thereof to the marginal edge of an opening formed in said side wall 50b. A stainless steel fluid conduit 98 is afforded communication with the interior of reservoir 50 by fastening thereof within an opening formed in side wall 50b.

Pressure responsive actuator 52 is formed with flexible stainless steel side walls 52a and 52b fastened together along their marginal edges as by welding. A fitting 100 fixed relative to the end of shaft 88 adapted with nut 92, is attached to side wall 52b of actuator 52 by welding an annular flange thereof to the marginal edge of an opening formed in said side wall 52b. One end of a stainless steel fluid conduit 102 is fixed within an opening in side wall 52b to provide communication between said conduit and the interior of actuator 52.

As shown in Figure 3, one end of conduit 98 is positioned adjacent the electrical gap afforded by oppositely disposed electrical poles 68 and 80 and one end of conduit 102 is positioned adjacent the electrical gap afforded by oppositely disposed electrical poles 66 and 72. With conduits 98 and 102 so positioned, a plastic matrix 104 is filled in between and around each of the magnetic poles 60 and 62, and each of the electrical poles 66, 68, 72 and 80 except for the space between the plurality of oppositely disposed magnetic pole faces and oppositely disposed electrical pole faces. Further, an opening is provided in the plastic matrix between each of the combined magnetic and electrical gaps to provide a continuous fluid passageway 105, the space adjacent openings 56c and 58c of magnetic members 56 and 58 respectively, being filled with plastic matrix to firmly secure the above mentioned ends of conduits 98 and 102 in their positions adjacent the respective electrical gaps. As shown in Figure 3, such arrangement provides an hermetically sealed continuous passageway from one end of conduit 98 through the plurality of combined magnetic and electrical gaps and the connecting passages afforded by the openings in the plastic matrix to one end of conduit 102. For most efficient operation, the cross-section of such openings in the plastic matrix between adjacent sets of magnetic and electrical gaps should be substantially the same as the cross-section of the combined magnetic and electrical gaps.

Actuator 52, conduit 102, passageway 105, conduit 98 and reservoir 50 are filled with electrically conductive fluid such as mercury to prevent formation of oxides of mercury which have a tendency to collect on the electrical poles and increase the resistance across the electrical gaps. Also, since mercury is very active chemically with copper of which the electrical poles are constructed, I prefer to coat the pole faces of each of the electrical poles 56, 68, 72 and 80 and the surfaces adjacent to such pole faces with an inert material such as rhodium to prevent amalgamation between the mercury and the copper. Further, to prevent chemical reaction between the mercury and the various other components which it comes in contact with, I prefer to construct fluid reservoir 50, actuator 52, fittings 94 and 100, and conduits 98 and 102 of stainless steel.

To prevent passage of electric current from the mercury in passageway 105 to the soft iron magnetic poles 60 and 62, I apply to each of the magnetic pole faces 60e and 62e a coating of electrical insulating material such as plastic or ceramic material.

As shown in Figure 1, one end of lead wire 76 is connected to a terminal member 104 insulatedly mounted within an opening formed in cover 24 and one end of lead wire 84 is connected in circuit with a terminal member 106 insulatedly mounted within an opening formed in control body 22. Connected between terminal member 104 and one side of thermocouple 20 is a lead conductor 112. Connected between terminal member 106 and the other side of thermocouple 20 is an electrical circuit comprising a lead conductor 114, cycling control means comprising a condition responsive circuit controlling device or switch in the form of a thermostat 108 and a by-pass resistor 122 in parallel circuit arrangement with switch 108, and a lead conductor 110.

Condition responsive switch 108 comprises an expansible and contractible enclosure or bellows 116 having a sub-atmospheric fill of inert gas and a pair of relatively movable end walls to which relatively movable electrical contacts 118 and 120 are individually secured. A sub-atmospheric fill is used to insure disengagement of contacts 118 and 120 in the event of rupture or other failure of bellows 116. I prefer to position switch 108 in the space to be heated by main burner 12 to thereby provide thermostatic control of the atmosphere thereof as will hereinafter appear in the description of the operation of the subject device. It is believed readily apparent that the particular condition responsive switch shown and described herein is not mandatory for successful operation of the subject control device, but rather, that any suitable condition responsive switching device may be employed. It is therefore intended that the claims appended hereto are not to be limited to the particular switching device shown and described.

Control body 22 is formed with a pilot valve seat 124 providing a pilot fuel port 125 and a main valve seat 126 providing a main fuel port 127. A pilot valve or control member 128 having a valve stem 130 is provided for cooperation with pilot valve seat 124 and movement to flow-controlling or operating, i.e. flow-permitting and flow-preventing, positions with respect thereto. Stem 130 is formed with an annular groove wherein an E ring 132 is positioned, there being a compression spring 134 interposed between ring 132 and control body 22 to bias pilot valve 128 into flow-preventing engagement with pilot valve seat 124.

A main valve or control member 136 is provided for cooperation with main valve seat 126 and movement to flow-controlling or operating, i.e. flow-permitting and flow-preventing, positions with respect thereto for control of fluid fuel flow to main burner 12. Fixed to or formed integrally with main valve 136 is a valve stem 138 formed with a reduced end portion 138a. Formed integrally with cover 24 is a depending mounting bracket 140 on which an operating lever 142 is pivotally mounted by means of a pin 144. Operating lever 142 is formed with an end portion 142a having an opening or hole for slidably receiving the reduced end portion 138a of main valve stem 138. The end of stem 138 is spun over against lever 142 to retain said members in fixed relation as shown in Figure 1.

Also pivotally mounted on bracket 140 by means of pin 144 is lever means comprising an L-shaped member 146 secured by means of rivets 151 to an actuating lever 148. Lever 148 is formed with an offset end portion 148a, a substantially straight intermediate portion 148b and a reversely bent end portion 148c. End portion 148a is formed with a nib or protuberance 148d for a purpose which will become apparent when the operation of the subject device is hereinafter described. Intermediate portion 148b of lever 148 is formed with an opening for slidably receiving an actuating stem 150 which is fixed to the central portion of movable side wall 52a of actuator 52. Stem 150 is formed with a shoulder portion 150a and a spun over end portion 150b for retaining stem 150 and wall 52a in the position shown in Figure 1. Actuating stem 150 is also formed with an enlarged end portion 150c for retaining a compression spring 152 in abutting relation with the intermediate portion 148b of actuating lever 148. Each of the free ends of end portions 142a and 148c of levers 142 and 148 respectively, is formed with notches or cutouts (not shown) for engagement with complementally formed notches (also not shown) in a U-shaped compression spring 154.

Secured to end portion 142b of operating lever 142 as by means of rivets 156, is an L-shaped lever 158 formed of spring steel or other flexible material to permit relative movement between an end portion 158a of lever 158 and operating lever 142 for a purpose to be hereinafter explained.

A manually operable reset stem 160 having an enlarged end portion 160a and a button 160b is slidably positioned within an opening 24a formed in cover 24. A compression spring 162 is interposed between button 160b and cover 24 to bias reset stem 160 to its retracted position as shown in Figure 1, there being sealing means 164 and a washer 166 interposed between one end of spring 162 and cover 24 to provide a gas-tight seal between reset stem 160 and opening 24a of cover 24.

The operation of the subject control device will now be described.

With pilot valve 128 and main valve 136 in their flow-preventing positions, as shown in Figure 1, fluid fuel is prevented from flowing to pilot burner 16 and main burner 12. In order to ignite pilot burner 16, it is first necessary to depress reset stem 160. Movement of reset stem 160 against the biasing force of spring 162 causes end portion 160a to contact end portion 158a of lever 158 which in turn contacts the nib or protuberance 148d formed in end portion 148a of actuating lever 148. Further movement of reset stem 160 against the force of spring 162 creates a force on operating lever 142 tending to rotate the same in a clockwise direction about mounting pin 144. However, since lever 142 is fixed relative to valve member 136 which is in firm seating engagement with valve seat 126, operating lever 142 is not free to move in a clockwise direction wherefore the force developed in flexible lever 158 insures disposition of main valve 136 in its flow-preventing position during resetting movement of stem 160 as shown in Figure 5. Also, such further movement of reset stem 160 creates a turning force on lever 148 causing the same to rotate in a clockwise direction about mounting pin 144. Such movement of lever 148 causes intermediate portion 148b to slide along actuating stem 150 against the force of spring 152 and end portion 148c to contact pilot valve stem 130 and move pilot valve 128 to its flow-permitting position against the force of spring 134 as shown in Figure 5. Such movement of lever 148 may cause U-shaped compression spring 154 to snap over center and exert a force tending to open main valve 136. However, the force of spring 154 is incapable of overcoming the holding force exerted on valve 136 by flexible lever 158, wherefore valve 136 will continue to be retained in its flow-preventing position as long as reset stem 160 is in its depressed position thereby providing flow interruption insuring safe lighting.

Movement of pilot valve 128 to its flow-permitting position permits fluid fuel to flow through pilot fuel port 125, pilot outlet chamber 36 and conduit 18 to pilot burner 16. The fuel emitted from pilot burner 16 is ignited in any well known manner.

The flame thus provided at pilot burner 16 impinges on the hot junction of thermoelectric generator 20 thereby producing an electrical potential which provides a current flow to mercury pump 48 through lead conductor 110, condition responsive switch 108 or by-pass resistor 122, depending upon the relative position of contacts 118 and 120, lead conductor 114, terminal 106, and lead wire 84, and back to generator 20 through lead wire 76, terminal member 104 and lead conductor 112. Such current flows in fluid conductor motor 48 from lead wire 84 to electrical conductor 78, through the mercury passageway 105 between oppositely disposed electrical poles 80 and 68, through the intermediate portion 64a of conductor 64 to electrical pole 66 and through the mercury passageway 105 between oppositely disposed electrical poles 66 and 68. Such current continues to flow through the serially arranged electrical conductors 64 and mercury passageway 105 between electrical gaps afforded by poles 66 and 68 until it reaches the electrical pole 66 disposed opposite electrical pole 72. At this point such current flows through the mercury passageway 105 between oppositely disposed electrical poles 66 and 72, through conductor 70 and terminal portion 74 to lead wire 76. It will be noted that the electric current always flows through the mercury in passageway 105 in the same transverse direction with respect thereto.

Magnetic flux is caused to flow from permanent magnet 86 through the mercury in passageway 105 of pump 48 between each of the oppositely disposed magnetic poles 60 and 62. The magnetic paths (Figures 1 and 2) are provided from one end of permanent magnet 86 through magnetic member 58 across the plurality of magnetic gaps between oppositely disposed salient poles 62 and 60, through magnetic member 56 to the other end of permanent magnet 86. It will be noted that the plurality of magnetic gaps are arranged in parallel and that the magnetic flux flow through the mercury in passageway 105 is at the same point as the electric current flow therethrough but in a direction transverse with respect to both the passageway and the direction of electric current flow.

As is well understood in the art, whenever a magnetic field and an electric current at right angles with respect to each other are passed through a given point in an electrically conductive fluid, a force is exerted on such fluid tending to move the same in a direction which is at right angles to both the direction of magnetic flux flow and the direction of current flow therethrough. Thus with permanent magnet 86 providing a constant continuous flow of magnetic flux through the mercury in passageway 105, the mercury is moved or pumped along said passageway whenever current is caused to flow across the serially arranged electrical gaps. In the device disclosed in the drawings, permanent magnet 86 and thermocouple 20 are so related as to cause the magnetic flux and electric current to flow through passageway 105 in the proper direction to cause the mercury to be pumped from within reservoir 50, through conduit 98, passageway 105, and conduit 102 into actuator 52. In this manner, the fluid pressure within actuator 52 is increased sufficiently to overcome the pressure on the external side of side wall 52a to move the same toward intermediate portion 148b of actuating lever 148.

The distance that wall 52a is moved toward lever 148 is dependent upon the pressure within actuator 52. Since permanent magnet 86 provides a continuous flow of a constant amount of flux, the pressure within actuator 52 is proportional to the amount of current flowing in the electrical circuit of mercury pump 48.

Thus, if thermostatic switch 108 is not calling for heat as evidenced by disengagement of contacts 118 and 120, the current flow to pump 48 must pass through resistor 122, whereby only a nominal amount of current is caused to flow through the electrical circuit of pump 48. Such nominal amount of current creates a fluid pressure within actuator 52 sufficient to move side wall 52a thereof a limited distance toward actuating lever 148. After such movement of wall 52a, reset button 160b may be released to permit reset stem 160 to be retracted to its initial position by spring 162. Such movement of reset stem 160 will not cause actuating lever 148 to be returned to its initial position, since spring 152 will merely move the intermediate portion 148b of lever 148 into abutting engagement with wall 52a of actuator 52. In this position of lever 148, end portion 148c thereof is effective to retain pilot valve 128 in flow-permitting position, but ineffective to cause overcenter spring 154 to position main valve 136 in its flow-permitting position.

With pilot burner 16 thus ignited, engagement of contacts 118 and 120 of thermostatic switch 108 short circuits resistor 122 thereby affording energization of mercury pump 48 directly from thermocouple 20. Such energization of mercury pump 48 at a higher energy level than when contacts 118 and 120 are disengaged, produces a greater pressure build up within actuator 52 thus causing side wall 52a thereof to move a further distance from its initial position. Such movement of side wall 52a causes further clockwise movement of lever 148 about mounting pin 144, such that end portion 148c thereof moves one end of U-shaped spring 154 overcenter. Such overcenter movement of spring 154 effects snap action counterclockwise movement of operating lever 142 about mounting pin 144, and hence snap action movement of main valve 136 to its flow-permitting position as shown in Figure 6. Thus, fluid fuel is permitted to flow through valve port 127, main burner fuel outlet chamber 38 and conduit 14 to main burner 12. The fuel thus emitted at main burner 12 is ignited by the flame of pilot burner 16 to afford heating of the space wherein condition responsive switch 108 is positioned.

Upon thermostatic switch 108 becoming satisfied, as indicated by disengagement of contacts 118 and 120 thereof, the current flow to pump 48 from thermocouple 20 will again be limited to a nominal or lower energy level by limiting resistor 120. Such decrease in current flow to pump 48 causes the pressure within actuator 52 to be decreased proportionately wherefore side wall 52a will be moved toward its initial position. Such movement of wall 52a causes actuating lever 148 to be rotated sufficiently in a counterclockwise direction about pivot pin 144 to cause overcenter spring 154 to snap overcenter and return main valve 136 to its flow-preventing position with snap action movement. Such movement of lever 148 however is insufficient to permit pilot valve 128 to be returned to its flow-preventing position by spring 134, wherefore fluid fuel continues to flow to pilot burner 16. In this manner, main burner 12 is ignited and extinguished in accordance with the relative position of contacts 118 and 120 of thermostatic switch 108 while pilot burner 16 continues to remain ignited.

In the event the flame at pilot burner 16 is extinguished, either accidentally or otherwise, both pilot valve 128 and main valve 136 are positioned in their flow-preventing positions. Extinguishment of the flame at pilot burner 16 permits the ambient atmosphere to decrease the temperature of the hot junction of thermocouple 20, thereby interrupting energization of mercury pump 48. In this event, the pressure within actuator 52 is decreased causing side wall 52a thereof to return to its initial position and permitting the coincidental counterclockwise movement of actuating lever 148 about pin 144 to return main valve 136 to its flow-preventing position with snap movement if it was in flow-permitting position prior to pilot flame extinguishment, and to return pilot valve 128 to its flow-preventing position under the biasing force of spring 134. In this manner, the subject control device provides automatic shut off of 100% of the fuel flow to the heating unit upon occurrence of an unsafe condition.

Although I have shown and described certain specific embodiments of my invention, I am fully aware that many modifications thereof are possible. My invention, therefore, is not to be restricted except insofar as is necessitated by the spirit of the appended claims.

I claim:

1. An electrically operated control device comprising a pair of control members each movable between one and another controlling position, an electroresponsive operator having actuating means operatively associated with both of said control members and movable upon energization of said operator at one level to one energized position retaining one of said control members in its said another controlling position when moved thereto, said actuating means also being movable upon energization of said operator at another level to another energized position effecting movement of the other of said control members from one to another of its controlling positions while continuing retention of said one control member in its said another controlling position, and cycling control means in circuit with said operator and with a source of electrical energy for effecting energization of said operator at said first and second levels alternatively to thereby effect cycling of said other control member between its said one and another controlling positions and continuous retention of said one control member in its said other position during such cycling of said other control member.

2. An electrically operated control device comprising a pair of control members each movable between one and another controlling position, an electroresponsive operator having actuating means operatively associated with both of said control members and having a deenergized position effecting disposition of both of said control members in their said one controlling position, said actuating means being movable upon energization of said operator at one level to one energized position retaining one of said control members in its said another controlling position when moved thereto, said actuating means also being movable upon energization of said operator at another level to another energized position effecting movement of the other of said control members from one to another of its controlling positions while continuing retention of said one control member in its said another controlling position, and cycling control means in circuit with said operator and with a source of electrical energy for effecting energization of said operator at said first and second levels alternatively to thereby effect cycling of said other control member between its said one and another controlling positions and continuous retention of said one control member in its said other position during such cycling of said other control member, failure of said source effecting deenergization of said operator and movement of both of said control members to their said one controlling positions.

3. An electrically operated control device comprising a pair of control members each movable between one and another controlling position, manual reset means for moving one of said control members from its said one to its said another controlling position, an electroresponsive operator having actuating means operatively associated with both of said control members and movable upon energization of said operator at one level to one energized position retaining said one of said control members in its said another controlling position when moved thereto, said actuating means also being movable upon energization of said operator at another level to another energized position effecting movement of the other of said control members from one to another of its controlling positions while continuing retention of said one control member in its said another controlling position, and cycling control means in circuit with said operator and with a source of electrical energy for effecting energization of said operator at said first and second levels alternatively to thereby effect cycling of said other control member between its said one and another controlling positions and continuous retention of said one control member in its said other position during such cycling of said other control member.

4. An electrically operated control device comprising a pair of control members each movable between one and another controlling position, an electroresponsive operator having actuating means operatively associated with both of said control members and movable upon energization of said operator at one level to one energized position retaining one of said control members in its said another controlling position when moved thereto, said actuating means also being movable upon energization of said operator at another level to another energized position effecting movement of the other of said control members from one to another of its controlling positions while continuing retention of said one control member in its said another controlling position, and condition responsive cycling control means in circuit with said operator and with a source of electrical energy for effecting energization of said operator at said first and second levels alternatively to thereby effect cycling of said other control member between its said one and another controlling positions in accordance with variations in a given condition and continuous retention of said one control member in its said other position during such cycling of said other control member.

5. An electrically operated control device comprising a pair of valves each movable between closed and open positions, an electroresponsive operator having actuating means operatively associated with both of said valves and movable upon energization of said operator at one level to one energized position retaining one of said valves in open position when moved thereto, said actuating means also being movable upon energization of said operator at another level to another energized position effecting movement of the other of said valves from closed to open position while continuing retention of said one valve in open position, and temperature responsive cycling control means in circuit with said operator and with a source of electrical energy for effecting energization of said operator at said first and second levels alternatively to thereby effect cycling of said other valve between open and closed positions in accordance with variations in temperature and continuous retention of said one valve in open position during such cycling of said other valve.

6. An electrically operated control device comprising main and pilot burner fuel valves each movable between closed and open positions, an electroresponsive operator having actuating means operatively associated with both of said valves and having a deenergized position effecting closure of both of said valves, said actuating means being movable upon energization of said operator at one level to one energized position retaining said pilot burner fuel valve in open position when moved thereto, said actuating means also being movable upon energization of said operator at another level to another energized position effecting opening movement of said main burner fuel valve while continuing retention of said pilot burner fuel valve in open position, and temperature responsive cycling control means in circuit with said operator and with a source of electrical energy for effecting energization of said operator at said first and second levels alternatively to thereby effect cycling of said main burner fuel valve between open and closed positions in accordance with variations in temperature and continuous retention of said pilot burner fuel valve in open position during such cycling of said main burner fuel valve, failure of said source effecting deenergization of said operator and closure of both of said valves to provide 100% shut-off of the fuel.

7. An electrically operated control device comprising main and pilot burner fuel valves each movable between closed and open positions, manual reset means for opening said pilot fuel valve and simultaneously holding said main fuel valve closed to provide flow interruption, an electroresponsive operator having actuating means operatively associated with both of said valves and having a deenergized position effecting closure of both of said valves, said actuating means being movable upon energization of said operator at one level to one energized position retaining said pilot burner fuel valve in open position when moved thereto, said actuating means also being movable upon energization of said operator at another level to another energized position effecting opening movement of said main burner fuel valve while continuing retention of said pilot burner fuel valve in open position, and temperature responsive cycling control means in circuit with said operator and with a source of electrical energy for effecting energization of said operator at said first and second levels alternatively to thereby effect cycling of said main burner fuel valve between open and closed positions in accordance with variations in temperature and continuous retention of said pilot burner fuel valve in open position during such cycling of said other valve, failure of said source effecting deenergization of said operator and closure of both of said valves to provide 100% shut-off of the fuel.

8. In a control system for controlling the flow of fuel to fuel burning apparatus having main and pilot burners and having a thermoelectric generator subject to the heat of burning fuel at said pilot burner, the combination of normally closed main and pilot burner fuel valves, an electro-responsive operator in circuit with said generator and having actuating means operatively associated with both of said valves movable upon energization of said operator at a predetermined lower lever to one energized position retaining said pilot fuel valve in open position when moved thereto, said actuating means also being movable upon energization of said operator at a predetermined higher level to another position effecting movement of said main fuel valve to open position while continuing retention of said pilot fuel valve in open position, a cycling thermostat responsive to the temperature of a medium heated by the heat of burning fuel at said main burner and having cooperating low resistance relatively movable contacts in circuit with said generator and operator, said contacts, when in circuit-making relation, effecting energization of said operator by current from said generator at said higher level of energization, in response to which both of said valves are open, and electrical resistance means connected in parallel circuit with said thermostat contacts and effecting, when said contacts are in circuit-interrupting relation, energization of said operator by current from said generator at said lower level in response to which said main burner fuel valve returns to its normally closed position while said pilot burner fuel valve is retained open by said actuating means, outage of the flame of said pilot burner and the resultant deenergization of said operator effecting disposition of both of said fuel valves in their normally closed position to provide 100% shut-off of the fuel flow to said burners.

9. In a control system for controlling the flow of fuel to fuel burning apparatus having main and pilot burners and having a thermoelectric generator subject to the heat of burning fuel at said pilot burner, the combination of normally closed main and pilot burner fuel valves, manual reset means for opening said pilot burner fuel valve and for insuring closure of said main burner fuel valve during resetting to provide flow interruption, an electroresponsive operator in circuit with said generator and having actuating means operatively associated with both of said valves movable upon energization of said operator at a predetermined lower level to one energized position retaining said pilot fuel valve in open position when reset thereto, said actuating means also being movable upon energization of said operator at a predetermined higher level to another position effecting movement of said main fuel valve to open position while continuing retention of said pilot fuel valve in open position, a cycling thermostat responsive to the temperature of the medium heated by the heat of burning fuel at said main burner and having cooperating low resistance relatively movable contacts in circuit with said generator and operator, said contacts, when in circuit-making relation, effecting energization of said operator by current from said generator at said higher level of energization, in response to which both of said valves are open, and electrical resistance means connected in parallel circuit with said thermostat contacts and effecting, when said contacts are in circuit-interrupting relation, energization of said operator by current from said generator at said lower level in response to which said main burner fuel valve returns to its normally closed position while said pilot burner fuel valve is retained open by said actuating means, outage of the flame of said pilot burner and the resultant deenergization of said operator effecting disposition of both of said fuel valves in their normally closed position to provide 100% shut-off of the fuel flow to said burners.

10. An electrically operated control device comprising a pair of control members each movable between one and another controlling position, an electromagnetic operator having an actuating member operatively associated with both of said control members and having a resilient connection with one of said control members, said actuating member being movable upon energization of said operator at one level from a de-energized position to a first energized position retaining the other of said control members in its said another controlling position when moved thereto, said actuating member also being movable upon energization of said operator at another level to another energized position effecting movement of said one control member from one to another of its controlling positions while continuing retention of said other control member in its said another controlling position, manual reset means operatively associated with said actuating member for actuation thereof from its de-energized toward its first energized position to thereby effect movement of said other control member to its said other controlling position, said reset means also being operatively associated with said one control member to insure, during manual actuation of said reset means, disposition of said one control member in its said one controlling position against any tendency thereof to be moved to its other controlling position by force from said actuating member transmitted thereto through said resilient connection, and cycling control means in circuit with said operator and with a source of electrical energy for effecting energization of said operator at said first and second levels alternatively to thereby effect cycling of said one control member between its said one and another controlling positions and continuous retention of said other control member in its said other controlling position during cycling of said one control member.

11. An electrically operated control device comprising main and pilot burner fuel valves each movable between open and closed positions, an electromagnetic operator having an actuating member operatively associated with both of said valves and having a resilient connection with said main fuel valve, said actuating member being movable upon energization of said operator at one level from a de-energized position to a first energized position retaining the pilot fuel valve in open position when moved thereto, said actuating member also being movable upon energization of said operator at another level to another energized position effecting movement of said main fuel valve from closed to open position while continuing retention of the pilot fuel valve in open position, manual reset means operatively associated with said actuating member for actuation thereof from its de-energized toward its first energized position to thereby effect movement of the pilot fuel valve to open position, said reset means also being operatively associated with said main fuel valve to insure, during manual actuation of said reset means, disposition of said main fuel valve in closed position against any tendency thereof to be moved to open position by force from said actuating member transmitted thereto through said resilient connection, and cycling control means in circuit with said operator and with a source of electrical energy for effecting energization of said operator at said first and second levels alternatively to thereby effect cycling of said main fuel valve between open and closed positions and continuous retention of the pilot fuel valve in open position during cycling of the main fuel valve.

References Cited in the file of this patent

UNITED STATES PATENTS

| | | |
|---|---|---|
| 900,103 | Kessler | Oct. 6, 1908 |
| 1,533,322 | Lewis | Apr. 14, 1925 |
| 1,558,276 | Peterson | Oct. 20, 1925 |
| 1,660,776 | Wragg | Feb. 28, 1928 |
| 2,033,678 | Buirk | Mar. 10, 1936 |
| 2,138,796 | Sparrow | Nov. 29, 1938 |
| 2,335,809 | Stacy | Nov. 30, 1943 |
| 2,481,265 | Van Denberg et al. | Sept. 6, 1949 |
| 2,588,674 | Van Denberg et al. | Mar. 11, 1952 |
| 2,635,637 | Karrer | Apr. 21, 1953 |
| 2,741,984 | Lindenblad | Apr. 17, 1956 |
| 2,748,710 | Vandenberg | June 5, 1956 |

FOREIGN PATENTS

| | | |
|---|---|---|
| 369,149 | Germany | Feb. 15, 1923 |